March 13, 1951 W. G. SEBOLD 2,545,052
EGG COOLER
Filed Nov. 17, 1947
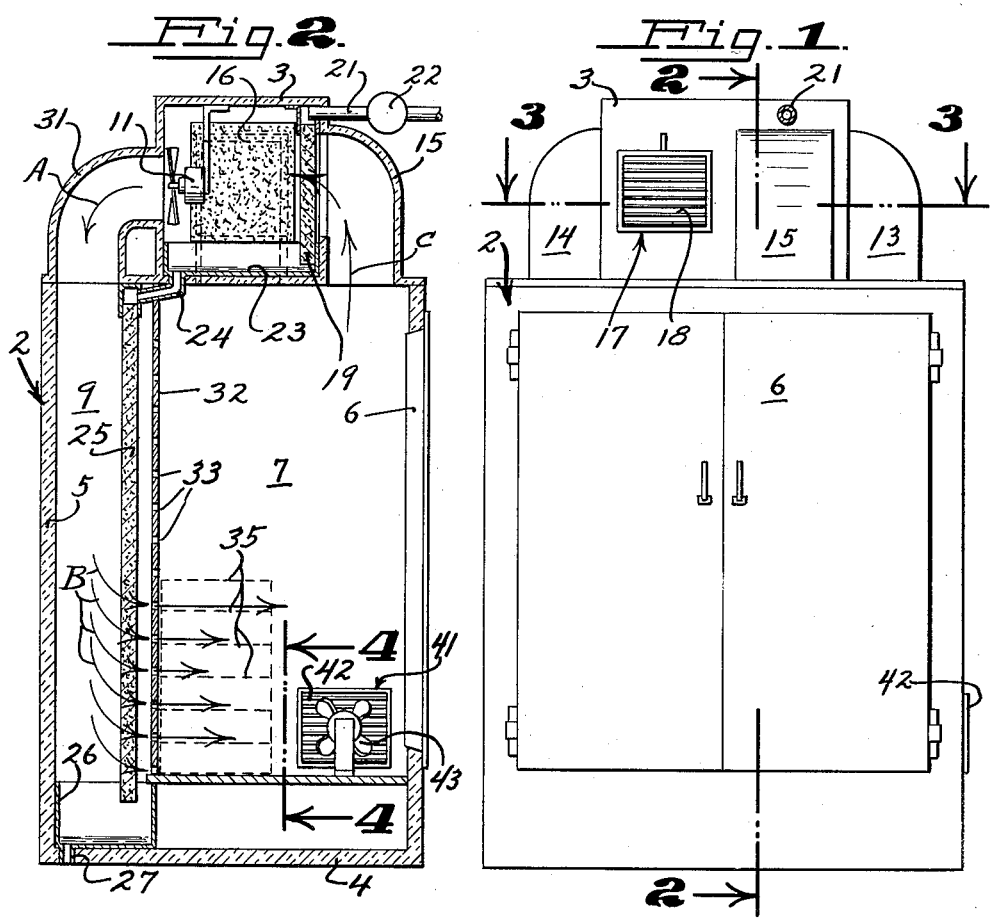
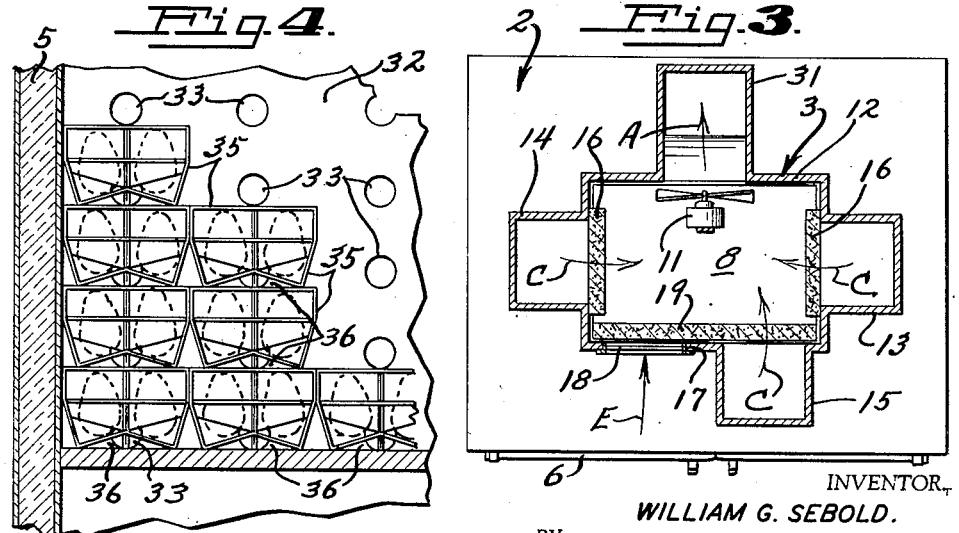
INVENTOR
WILLIAM G. SEBOLD.
BY
Stephen F. Townsend
ATTORNEY.

Patented Mar. 13, 1951

2,545,052

UNITED STATES PATENT OFFICE 2,545,052

EGG COOLER

William G. Sebold, Walnut Creek, Calif.

Application November 17, 1947, Serial No. 786,452

6 Claims. (Cl. 34—72)

This invention relates to coolers, and, more particularly, to an improved egg cooler adapted to cool and maintain eggs in a truly fresh condition during storage.

In some egg handling operations it takes over a week to collect, candle, pack and then distribute eggs for resale to the ultimate consumer. Usually it takes approximately two weeks for the retailer to dispose of the eggs to the ultimate consumer. During storage, after collection from the producer and prior to ultimate sale for use, the eggs are normally subjected, during display, to a temperature of around 75° to 80° Fahrenheit and are advertised as "fresh" eggs. Temperatures conducive to germination range upwardly from about 68° Fahrenheit to 70° Fahrenheit. A certain percentage of eggs delivered for marketing are fertile and germination proceeds when subjected to temperatures upward from about 68° Fahrenheit, thereby causing a resultant malodorous stench and spoiling the egg for human consumption.

In order to maintain eggs in a fresh condition, they should be placed in a cool, slightly moist, ventilated enclosure, preferably, the temperature in the storage enclosure should be maintained within the range of about 55° Fahrenheit to 68° Fahrenheit. In some instances egg companies or retail stores try to maintain the quality of freshness desirable in eggs, and, therefore, place the eggs in ice boxes, or other display or storage refrigerating units. However, the temperatures in apparatus of the character of refrigerators tend to cause the eggs to freeze and are, therefore, not truly "fresh" eggs of the type to command premium prices.

Again, ice and refrigerating apparatus utilize valuable storage space and are relatively expensive to maintain in operation.

A principal object of the present invention is to provide a mechanical egg cooler, adapted to cool eggs and maintain eggs at a temperature below germination conducive temperatures and thereby to enable storage of eggs for long periods of time in a truly fresh condition.

A further object of the invention is to provide an egg storage container which is provided with water evaporation means to cool and maintain eggs in a cool condition, and which is provided with air conditioner means to keep the stored eggs slightly moist.

A further object is to provide an egg cooling and storage container which may be operated inexpensively for long periods of time and which maintains the stored eggs well below room temperature and below temperatures conducive to germination.

A further object is to provide a cooling apparatus utilizing water evaporation as a cooling means, and which is provided with means to recirculate at least a portion of the cooled air.

Another object is to provide a cooling apparatus provided with means to channel cooled moist air to eggs for direct contact therewith.

A still further object is to provide a cooling apparatus of the type mentioned which is provided with a cooled air distributor adapted to increase the velocity of cooled air impinged upon the shells of the eggs stored in the cooling apparatus.

Other objects are to provide a relatively inexpensive cooler, which is economic to operate and simple and sturdy of construction.

Still other and further objects and advantages of this invention will become apparent upon referring to the specification and accompanying drawings in which similar characters of reference represent corresponding parts in the several views.

Referring to the drawings:

Fig. 1 is a front elevational view of the egg cooler.

Fig. 2 is a sectional view taken on line 2—2 of Fig. 1.

Fig. 3 is a sectional view taken on line 3—3 of Fig. 1.

Fig. 4 is an enlarged fragmentary sectional view taken on line 4—4 of Fig. 2.

The apparatus comprises a cabinet or box, generally indicated at 2, comprising insulated top 3, bottom 4, side and back walls 5, and conventional front doors 6. The cabinet 2 comprises a storage area 7, air cooling chamber 8, and air distributing chamber 9, as will more fully hereinafter appear. It may be here noted that for purposes of illustration and clarity of terms the chamber 9 is referred to as to "air distributing chamber," although it serves the dual function of both cooling and distributing the air.

The air cooling chamber 8, disposed at the top of the cabinet, is provided with an air circulation inducing means, such as a conventional power fan 11, and comprises a generally rectangular housing 12 in fluid communication with a plurality of recirculation ducts 13, 14 and 15 which in turn are in fluid communication with the interior of the box adjacent to the top thereof and overlying the storage area 7. Disposed over the point of entry of each duct 13 and 14 into chamber 8 is a filter element 16, such as a pad of air porous asbestos, adapted to remove at least a portion of the moisture carried by the air passing into the said chamber 8 as will more fully hereinafter appear.

An aperture 17, which may be provided with an adjustable closure 18, is provided in the housing 12 in communication with atmosphere. A water distributing and air cooling element 19, such as a pad of wood pulp or other suitable water absorbent air-porous material, is disposed over the point of entry of duct 15 into housing 12 and over aperture 17. Disposed above element 19 is a water pipe 21, connected to any suitable source of water and provided with a conventional manually adjustable flow governing valve 22. Beneath the element 19 and preferably overlying the floor of the housing 12 is a water receiving tray or pan 23 provided with an outlet 24 in liquid communication with a porous water-absorbent sheet 25 formed of burlap, wood pulp, or the like, disposed vertically in the air distributing chamber 9 and extending from top to bottom thereof and spaced inwardly from the back wall of the cabinet.

A trap or gutter element 26 is disposed in the bottom of the chamber 9 under sheet 25 to receive water dripping therefrom. A discharge 27 is provided in gutter 26 and may be connected to any suitable place of disposal, or may be suitably conventionally connected to pipe 21 in order to recirculate the water.

The air distributing chamber 9 extends from top to bottom of the cabinet and is in fluid communication with the air cooling chamber 8 through exhaust duct 31. The chamber 9 is defined by a partition 32 which extends from top to bottom of the cabinet and spaced inwardly from the back wall 5 of the cabinet. The sheet 25 is interposed between the partition 32 which extends from top to bottom of the cabinet and is spaced between the back wall 5 of the cabinet and the said partition 32. Preferably the partition is formed from a sheet of suitable metal which is preferably rustproof. A plurality of preferably equally spaced uniform size holes 33 are provided from top to bottom and side to side in the partition 32. The holes 33 are of restricted size in order to increase the velocity of moist cooled air emitted from chamber 9 into storage area 7 through the said apertures 33.

As illustrated, the apertures 33 are equally spaced from one another to conform to stacked carton 35 of eggs stored in the cabinet so that each aperture connects directly with an adjacent egg carton adjacent to the bottom thereof. As herein illustrated, the egg cartons are of the general type described in United States Patent No. 1,990,336, and characterized by a longitudinal channel 36 extending the length of the box. The air streams emitted from apertures 33 discharge into the channels 36 disposed in alignment therewith and cools, ventilates and humidifies the eggs contained in the cartons.

Provided in the bottom front of the cabinet in the storage area is an aperture 41 communicating with atmosphere and having an adjustable closure 42. A power fan 43 may be disposed in the cabinet in registry with the aperture 41 in order to expel air from the storage area. The aperture 41, closure 42 and fan 43 serve as a humidity control particularly with respect to moist air which may not tend readily to circulate upwardly from adjacent to the bottom front of the storage area through the recirculation ducts 13, 14 and 15.

It may be desired to omit the doors 6 from the cabinet, thereby leaving the front of the cabinet open to communication with atmosphere and enable easy access of customers to the cabinet interior. I have found that very satisfactory cooling results may be obtained if the cabinet front is open, inasmuch as the cool air admitted to the storage area through apertures 33 creates a curtain of cool air adjacent to the front of the box and prevents relatively warm atmospheric temperature from effecting the desired cooling function of the cooler. Further, enough of the air is recirculated through the recirculation ducts 13, 14 and 15 to maintain the desired temperature drop in the storage area.

In operation, cartons of eggs are stacked in the storage area, preferably in such a manner that a channel 36 of each carton is in alignment with an aperture 33. The fan 11 sucks air in from atmosphere in the direction of arrow E, through aperture 17, and moist cooling element 19. The air is cooled by evaporation through contact with element 19 and the water contained in tray 23, and is exhausted in the direction of arrow A into the air distributing chamber 9 for further cooling and distribution. The air so exhausted into chamber 9 is further cooled by contact with and passage through moist element 25, and is then discharged under pressure, in the manner illustrated by arrows B, through restricted orifices 33 in partition 32 for contact with the eggs in storage area 7.

The cold moist air is then conveyed through ducts 13, 14 and 15 and elements 16 and 19, in the direction of arrows C, mixes with air entering through aperture 17 and element 19, and is recirculated. The recirculation of cooled air has been found to reduce the temperature in the box and, by means of drying elements 16, a portion of the moisture is removed from the air recirculated in order to maintain a satisfactory moisture balance in the box.

I have found that it is very important the elements 19 and 25 should be moist but not soaked with water in order to obtain the best results.

In the event the front of cabinet is open to atmosphere by removal of the doors 6 as may be desired, the operation of the cooler remains the same except that there is not quite as great a temperature drop maintained in the box as when the front is enclosed. Further, some of the air from atmosphere may be drawn through recirculation duct 15, but in such event is subjected to cooling element 19 in the same manner as air entering through aperture 17.

I attribute a great part of the success of this invention to the air distributing chamber and, more particularly, to the arrangement of the restricted orifices 33 provided in partition member 32 inasmuch as the cooled moist air is discharged, under pressure, at increased velocity directly into the storage area, thereby effecting an improved and efficient cooling function not heretofore obtained.

The humidity control mechanism, comprising fan 43, aperture 41 and adjustable closure 42, is important to eliminate so-called "dead air" from adjacent to the front bottom portion of the cabinet particularly where the cabinet is filled to capacity with egg cartons.

While this invention has been described in rather specific detail for purposes of clarity by way of example and illustration, it is understood that certain changes, alterations and modifications may be practiced by those skilled in the

I claim:

1. An egg cooler comprising a cabinet, a vertical partition disposed rearwardly in said cabinet to define an egg storage space and an air distributing chamber, air-cooling means in flow communication with said air distributing chamber, said air-cooling means comprising a housing disposed at the top of the cabinet and containing an air circulation-inducing fan arranged to suck air from atmosphere through an air porous, water-moist air cooling element and expel said air so cooled into said air distribution chamber, a plurality of spaced restricted orifices provided in said partition from top to bottom thereof through which air is emitted from said air distributing chamber into said egg storage space, a second water-moist cooling element formed of air-porous material positioned in said air distributing chamber and arranged parallel to and spaced rearwardly from said partition to contact air expelled from said first named air-cooling means and prior to discharge thereof through said restricted orifices said cabinet provided with auxiliary means including a fan to expel air from said cabinet adjacent to the bottom thereof and forwardly of said partition, and means to supply water to said air-cooling elements.

2. An egg cooler comprising a cabinet, a vertical partition disposed rearwardly in said cabinet to define an egg storage portion thereof and an air distributing chamber, air-cooling means disposed above said egg storage portion and in fluid communication therewith and with said air distributing chamber, said air-cooling means comprising a housing having an opening to atmosphere and an air circulation inducing fan arranged and positioned to suck air from atmosphere through an air-porous, water-moist, air-cooling element disposed over said opening to atmosphere to suck air from said storage portion through a moisture absorbent air-porous element and expel said air into said air-distributing chamber, a plurality of substantially equally spaced restricted orifices provided in said partition from top to bottom and side to side thereof, through which air is emitted from said air-distributing chamber into said storage, a second air-porous, water-moist, air-cooling element positioned in said air-distributing chamber and spaced rearwardly from said partition and parallel thereto and co-extensive therewith, and arranged to contact air expelled from said first named air-cooling means and prior to discharge thereof through said restricted orifices for contact under pressure with eggs contained in said storage portion, and means to supply water to said two water-moist, air-cooling elements.

3. An egg cooler according to claim 2 and wherein a plurality of air ducts is provided to connect said housing for said first named air-cooling means with the egg storage portion of said cabinet, at least one of said ducts communicating with an air-porous, water-moist, air-cooling element in said housing and at least one said duct communicating with a moisture absorbent air-porous element.

4. An egg cooler according to claim 2 and wherein auxiliary means is provided in said egg storage portion of said cabinet adjacent to the bottom front thereof to expel air from said storage portion, said last named means comprising a fan and vent to atmosphere.

5. An egg cooler according to claim 2 and wherein means is provided whereby water supplied to said first named air-porous, water-moist, air-cooling element also supplies said second air-cooling element, said last named means comprising a water receiving tray and outlet therefrom in alignment with the top of said second air-cooling element.

6. An egg cooler comprising a cabinet, a vertical partition disposed rearwardly in said cabinet to define an egg storage space and an air distributing chamber, air-cooling means in flow communication with said air distributing chamber, said air-cooling means comprising a housing disposed at the top of the cabinet and containing an air circulatin-inducing fan arranged to suck air from atmosphere through an air porous, water-moist air cooling element and expel said air so cooled into said air distribution chamber, a plurality of spaced restricted orifices provided in said partition from top to bottom thereof through which air is emitted from said air distributing chamber into said egg storage space, a second water-moist cooling element formed of air-porous material positioned in said air distributing chamber and arranged parallel to and spaced rearwardly from said partition to contact air expelled from said first named air-cooling means and prior to discharge thereof through said restricted orifices, means to circulate air from said egg storage space into said air distributing chamber, said means comprising a plurality of air ducts open to the top of the cabinet to connect said housing of said air cooling means to the egg storage space portion of said cabinet at the top of said storage space portion, and means to supply water to said air-cooling elements.

WILLIAM G. SEBOLD.

REFERENCES CITED

The following references are of record in the file of this patent:

UNITED STATES PATENTS

| Number | Name | Date |
|---|---|---|
| 1,143,362 | Coxe | June 15, 1915 |
| 1,275,191 | Adair | Aug. 3, 1918 |
| 1,784,727 | Harris | Dec. 9, 1930 |
| 1,859,613 | Bailey | May 24, 1932 |
| 1,853,424 | Harris | Apr. 12, 1932 |
| 1,896,787 | Prudente et al. | Feb. 7, 1933 |